(12) United States Patent
Jeanneteau et al.

(10) Patent No.: US 10,573,476 B2
(45) Date of Patent: Feb. 25, 2020

(54) APPARATUS, METHOD, APPLIANCE, AND COMPUTER PROGRAM PRODUCT FOR OPERATING A RELAY

(71) Applicant: Electrolux Appliances Aktiebolag, Stockholm (SE)

(72) Inventors: Laurent Jeanneteau, Forli (IT); Alex Viroli, Forli (IT); Massimo Nostro, Forli (IT); Fabio Angeli, Forli (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 197 days.

(21) Appl. No.: 15/326,533

(22) PCT Filed: Jul. 23, 2015

(86) PCT No.: PCT/EP2015/066828
§ 371 (c)(1),
(2) Date: Jan. 16, 2017

(87) PCT Pub. No.: WO2016/034329
PCT Pub. Date: Mar. 10, 2016

(65) Prior Publication Data
US 2017/0207048 A1    Jul. 20, 2017

(30) Foreign Application Priority Data

Sep. 3, 2014   (EP) .................................. 14183315

(51) Int. Cl.
*H01H 47/00* (2006.01)
*H01H 3/00* (2006.01)
(Continued)

(52) U.S. Cl.
CPC .......... *H01H 47/002* (2013.01); *H01H 3/001* (2013.01); *H01H 47/22* (2013.01);
(Continued)

(58) Field of Classification Search
USPC ........................................................ 361/170
See application file for complete search history.

(56) References Cited

U.S. PATENT DOCUMENTS 5,255,152 A * 10/1993 Estes, III ............. H01H 47/325
                                                           327/172
5,406,440 A *  4/1995 Wieloch ............... H01H 47/325
                                                           327/385
(Continued)

FOREIGN PATENT DOCUMENTS

CN        101073133      11/2007
DE   10 2012 011251 A1  12/2013
(Continued)

OTHER PUBLICATIONS

CN Office action for CN application No. 2015800368105 dated Feb. 5, 2018, 9 pages.
(Continued)

*Primary Examiner* — Danny Nguyen
(74) *Attorney, Agent, or Firm* — Pearne & Gordon LLP (57) ABSTRACT

Contacts of a relay may glue together during operation. This state may be measured and a controller may issue a pulse width-modulated signal at a certain duty cycle and frequency in order to vibrate the relay contacts to make them open again. Once this is the case, the process is stopped. This process may be repeated a certain number of times, and if successfully degluing is not possible, a notification may be generated. Also after a certain number of degluing cycles, a signal may be generated to indicate replacement of the relay.

18 Claims, 4 Drawing Sheets

(51) Int. Cl.
*H01H 47/22* (2006.01)
*B23K 9/095* (2006.01)

(52) U.S. Cl.
CPC ........ *B23K 9/095* (2013.01); *H01H 2047/003* (2013.01); *H01H 2231/012* (2013.01)

(56) References Cited

U.S. PATENT DOCUMENTS

| | | | | |
|---|---|---|---|---|
| 5,930,104 | A * | 7/1999 | Kadah | H01H 47/325 361/156 |
| 6,137,193 | A | 10/2000 | Mitsuhiko | |
| 7,298,148 | B2 * | 11/2007 | Drake | G01R 31/3278 324/418 |
| 9,384,926 | B2 * | 7/2016 | Kim | H01H 47/22 |
| 2006/0114635 | A1 * | 6/2006 | Laurent | H01H 47/002 361/160 |
| 2006/0212745 | A1 * | 9/2006 | Zansky | G01R 31/3277 714/6.12 |
| 2013/0313979 | A1 * | 11/2013 | Jones | H05B 33/0809 315/159 |
| 2014/0159623 | A1 * | 6/2014 | Ko | H02P 6/21 318/400.11 |
| 2015/0055269 | A1 * | 2/2015 | Kim | H01H 47/22 361/170 |
| 2015/0270081 | A1 * | 9/2015 | Hartl | B60R 16/03 361/170 |

FOREIGN PATENT DOCUMENTS

| | | |
|---|---|---|
| EP | 0694937 | 1/1996 |
| FR | 2 959 593 A1 | 11/2011 |

OTHER PUBLICATIONS

EPO Office action for European application No. 14183315.2, dated Jun. 27, 2017.
International Search Report and Written Opinion from Corresponding Application No. PCT/EP2015/066828; dated Sep. 30, 2015.

* cited by examiner

APPARATUS, METHOD, APPLIANCE, AND COMPUTER PROGRAM PRODUCT FOR OPERATING A RELAY

In environments where reliability is of utmost importance, often parts are used that in the past have proven to be long-term stable and to be operable on a long term basis without failure. Such parts are often available on the market manufactured by different suppliers, they are available with various technical parameters and specifications, and thus the provision of a second source is not a problem. Parts like that are e.g. relays that are often used in industrial applications. Their reliability is important and their complexity has to be kept on a basic level in order to keep the costs at a low level and the service-ability easy.

In household environments, relays are often used in switching is applications where a considerable amount of power has to be switched reliably and frequently. Applications there are conceivable in washing machines, dishwashers and kitchen ovens. A field of use in a kitchen environment is the operation of a relay in a duty cycle power control. Such duty cycle power controts are often used to control electric heaters, such as used in kitchen ovens or in cooktops, such as glass ceramic fields.

However, a known problem with power switching using relays is that due to the light arc building when the contact bridge is closed, relay contacts may stick to each other, a phenomenon also known as gluing of the contacts. If the contacts stick together instead of opening, as required according to a control command, then problems may arise due to the overload of a device being switched by the load circuit of the relay that is not designed to withstand high power for a long period of time. As such, glued contacts in a relay may cause significant damage and lead to destruction of major components of the appliance where they are used. Light arcs may weld the contacts together in a small area and thus prevent the opening of the contacts once the current through the coil that operates the load circuit of the relay is switched off and spring force is applied to the contacts, which should lead to the opening of the contact-bridge formed by the relay contacts.

In the German publication document DE 10 2012 011251 A1, a device with an electromechanical relay is discussed. In the load circuit of the relay, a preheater in the air duct of a vehicle is operated. A voltage drop in the load circuit is measured when the load circuit is opened. If this is not the case, a sequence of pulses is applied in order to open the contact bridge. A control light is switched on to indicate malfunction.

The invention is based on the problem to improve the usability of a relay in a household appliance while at the same time extending service intervals.

This problem is solved by an apparatus for operating a relay according to claim 1, a method for operating a relay according to claim 9, a household appliance according to claim 14 and a computer program product according to claim 15.

Further developments of the invention are given in the dependent claims.

Advantageously, according to an embodiment of the apparatus according to the present invention, the duty cycle of the driver of the relay is controlled in dependency of a verification signal. This allows it to switch from a normal duty cycle of the relay to a duty cycle that allows a degluing of the relay contacts in an efficient way.

Beneficially, the dependency on the verification signal according to this embodiment allows it to only maintain a degluing duty cycle as long as the contacts of the load circuit of the relay actually stick together.

Beneficially, according to a further development of an embodiment of the apparatus according to the present invention, in case of a wrong switching state, the controller is adapted to operate the controlled duty cycle for a limited period of time as the load for the relay can be kept to a minimum; and the period of time reflects results of experiments that have been guided in practice, which have shown that after a certain amount of time and a particular degluing duty cycle in most cases the relay contacts are deglued and open again.

Advantageously, according to a further development of an embodiment of the apparatus according to the present invention, the controller is adapted to control the duty cycle with certain duty cycle parameters that have proven to optimally deglue relay contacts in a test environment. In this manner, the reliability is improved, the time needed for the maintenance of the relay is reduced and the operational lifetime of the relay is extended.

Beneficially, according to a further development of an embodiment of the apparatus according to the present invention, the driver operates the coil at a certain frequency. In this manner, an optimum frequency can be applied to the coil with a certain duty cycle that allows it to deglue the relay contacts in an optimum fashion.

Beneficially, according to a further development of an embodiment of the apparatus according to the present invention, particular frequencies are applied from the driver to the coil of the relay in order to optimally deglue the contacts. In this manner, frequencies can be provided that cause vibrations that optimally vibrate the contact surfaces and break occasional welding connections in a reliable manner.

Favorably, according to a further development of an embodiment of the apparatus according to the present invention, the controller is adapted to repeat a degluing time interval, a plurality of times in case the verification signal indicate no opening of the contact bridge in the load circuit. Thus, an automated degluing process is implemented that more reliably deglues contacts in a predefined number of cycles that increase the probability of degluing the contacts.

Beneficially, a delay or break is provided between the different cycles in order to allow the mechanical stress respectively thermal load to decrease before the next cycle is applied.

Advantageously, according to a further development of an embodiment of the apparatus according to the present invention, the number of cycles where the degluing duty cycle is applied to the relay is counted by a counter of the apparatus as in this case after a certain number corrective measures a notification can be provided.

Favorably, according to a further development of an embodiment of the apparatus according to the present invention, as a corrective measure a notification signal can be generated or the number of cycles can be limited to a certain predefined number.

Advantageously, according to the method according to the present invention, it is verified if contacts of the relay are glued together; and if this is the case, a duty cycle at a switching frequency is provided in order to deglue the contacts.

Advantageously, according to a further development of the method according to the present invention, a certain period of time under which the relay is exposed a degluing duty cycle is repeated in order to securely deglue the relay contacts or in order to provide several passes in case the first pass was not successful in degluing the relay contacts.

Beneficially, a delay is provided between the different passes in order to allow excess mechanical or thermal stress to disappear.

Advantageously, according to a further development of an embodiment of the method according to the present invention, five passes are counted, and if in this case the relay contacts are not open, a notification signal is generated in order to inform an operator that a maintenance activity is required respectively to cut the power to the load circuit in order to avoid overload of the load.

Advantageously, according to a further development of an embodiment of the method of the present invention, certain parameters are maintained for the duty cycle, the frequency applied to the coil and thus to the relay contacts of the contact bridge and the duty cycle in order to maximize the effect of the method according to the present invention while at the same time protecting the circuitry and the load maximally.

Advantageously, according to a further development of an embodiment of the method according to the present invention, the number of successful degluing of a certain relay is counted and after the predetermined number of degluing cycles has been successfully completed, a change signal is generated in order to provide for the change the relay.

In this manner, beneficially, a total failure of the relay can be prevented in time and the relay can be serviced without causing a device to fail in which the apparatus is built into.

Beneficially, a household appliance according to the present invention comprises an apparatus for operating a relay, because such a household appliance will be reliable technically, simple and easy to manufacture.

Beneficially, a computer program product according to the present invention will allow servicing the apparatus in the field by easily updating the parameters of the controller, while at the same time also being able to allow easy adaptation of the apparatus to different relays.

Subsequently, the invention will further be explained on the basis of examples shown in drawings, wherein.

Figure 1:
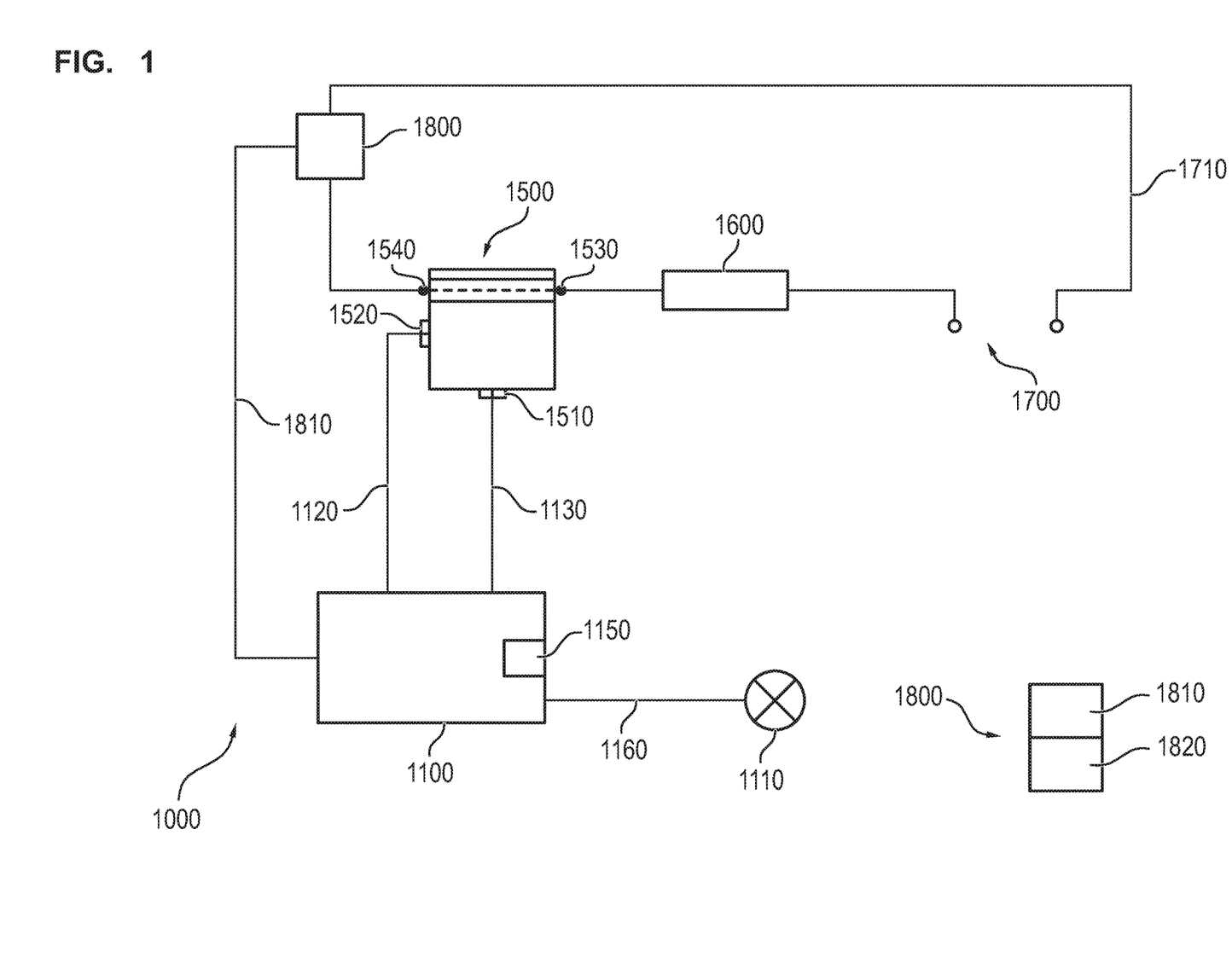
FIG. 1 shows a basic apparatus according to the present invention.

As FIG. 1 shows, a basic configuration of a preferred embodiment of an apparatus according to the present invention consists of a minimum number of components which are depicted in this Figure. E.g. there is a power supply 1700 that is connected to a load 1600, which is part of a load circuit that is switched by a relay 1500 to which the load circuit is connected at contacts 1530 and 1540. The load circuit also contains a measuring device 1800 that gathers properties of the load circuit and generates a verification signal 1810 according to the detected results respectively properties of the load circuit.

The circuit is referred by reference 1710. The relay 1500, e.g. a commonly available part, comprises a magnetic coil that is spring-loaded in the fashion that in case the coil is not energized, which takes place over contact 1510 and 1520, the contact bridge closing the circuit 1710 between contact 1530 and 1540 of the load circuit switched by the relay is open. However, there are also relays that once de-energized close the contact bridge, and thus the circuit design of the apparatus may be adapted accordingly.

The apparatus 1000 also comprises a controller 1100 that controls the energization of the magnetic coil of the relay 1500 via power lines 1120 and 1130 of a control circuit. Beneficially, the controller 1100 is provided with a verification signal 1810 from the device 1800 and thus is informable about the properties of the load circuit 1710. The controller 1100 may comprise a memory 1150 that is loadable e.g. with instructions and parameters and controls the operation of the controller. In particular, the switching properties of the relay 1500 may be controlled by a program stored in the memory 1150.

Also shown is a computer program product 1800 that comprises a memory chip or the like for storing instructions and code 1810.

Such a computer program product may be inserted into the controller or is connected by wire or wirelessly in order to communicate with the memory 1150 of the controller 1100 and to provide appropriate instructions to the controller or e.g. gather information stored in the controller.

In a common operation case, the load circuit will be closed, which means that the contact bridge between contacts 1530 and 1540 of the relay is closed. The device 1800 measures the property of the load circuit and detects that the load circuit is closed and that the current is flowing through the load once the power supply 1700 is connected and operational. The status of the load circuit is communicated via the verification line 1810 to the controller 1100. As required, the controller may deenergize the coil of the relay 1500 in order to cause it to open the contact bridge between contracts 1530 and 1540.

As mentioned above, the inverse operation may also be possible. The device 1800 detects the parameters of the load circuit, and if the load circuit 1710 is open, the corresponding parameters are communicated to the controller 1100. However, in the course of plural open and closed cycles of the contact bridge of the relay 1500, it may happen that the contacts on the relay tongue due to light arcs forming when switching may be welded to each other, a phenomenon that is called gluing. In this case, if the load circuit is to be opened, a corresponding activity will be instructed by the controller 1100 to the relay 1500. But the spring load will not be sufficient to open the relay contacts. In this case, corresponding parameters respectively a voltage drop, or corresponding parameters will not be measured by the device 1800, and the corresponding result will be notified via verification line 1810 to the controller 1100. If this is the case, the controller 1100 will beneficially cause vibrations on the relay contact by energizing the coil of the relay via lines 1120 and 1130 according to a certain duty cycle.

Especially, a duty cycle of about 80% will be applied by a switching frequency of 20 Hz to the contacts in order to deglue the contacts. This frequency has been proven to be appropriate with said power cycle once applied for about a period of time that is chosen to be preferable one second. However, there is a range of parameters conceivable, such as the duty cycle may be preferably between 60 and 90%, more preferably between 70 and 85% or precisely 80%.

On the other hand, the pulse-width modulated signal may be applied with a frequency of 15 to 25 Hz or preferably 17 to 22 Hz or most preferably with a frequency of 20 Hz. It has been observed by the inventors that degluing can be efficiently effected by applying such a degluing duty cycle for a period of one second. On the other hand, the period can be preferably 1.5 seconds, or more preferably 2 seconds, but most preferably it is 1 second.

The controller 1100 may comprise a counter realized in hardware or in software or in firmware that counts a number of degluing cycles.

As a degluing cycle here, the operation of a duty cycle power control for the period of e.g. 1 second will be defined or a comparable operation of the duty cycle of 80%, a pulse-width modulation of 20 Hz for a predetermined time period. In the case of the application of this degluing cycle, if the contacts will open, this will be detected by the device 1800 and corresponding parameters will be communicated over the verification line 1810. In this case, preferably no further actions will be taken. On the other hand, if the contacts are still closed, the controller may apply another degluing cycle after e.g. a certain delay in order to allow mechanical and thermal stress to rebuild. Such a delay may preferably be in the range of 2 seconds.

Beneficially, if the relay contacts do not open after a degluing and a reapplication of such a degluing cycle, this procedure may be repeated until 5 cycles preferably are completed. If then the contacts are still not open, a signal may be generated in order to inform a user to replace the relay. On the other hand, if successfully degluing the contacts is possible, the number of times of successfully degluing the relay contacts may be counted; and once a certain number is reached that is predetermined, a notification may be generated by the controller 1000 in order to effect e.g. the replacement of the relay 1500. Here, the relay may then be replaced, once the apparatus is not operational, and thus no defect will be caused during the operation of the apparatus.

Beneficially, the apparatus can be built into a household appliance in order to control e.g. the heater of an oven or a kitchen hob. During a normal operation, the controller 1100 may operate the heater with a duty cycle in order to e.g. control the heating power of the heater.

Figure 2:
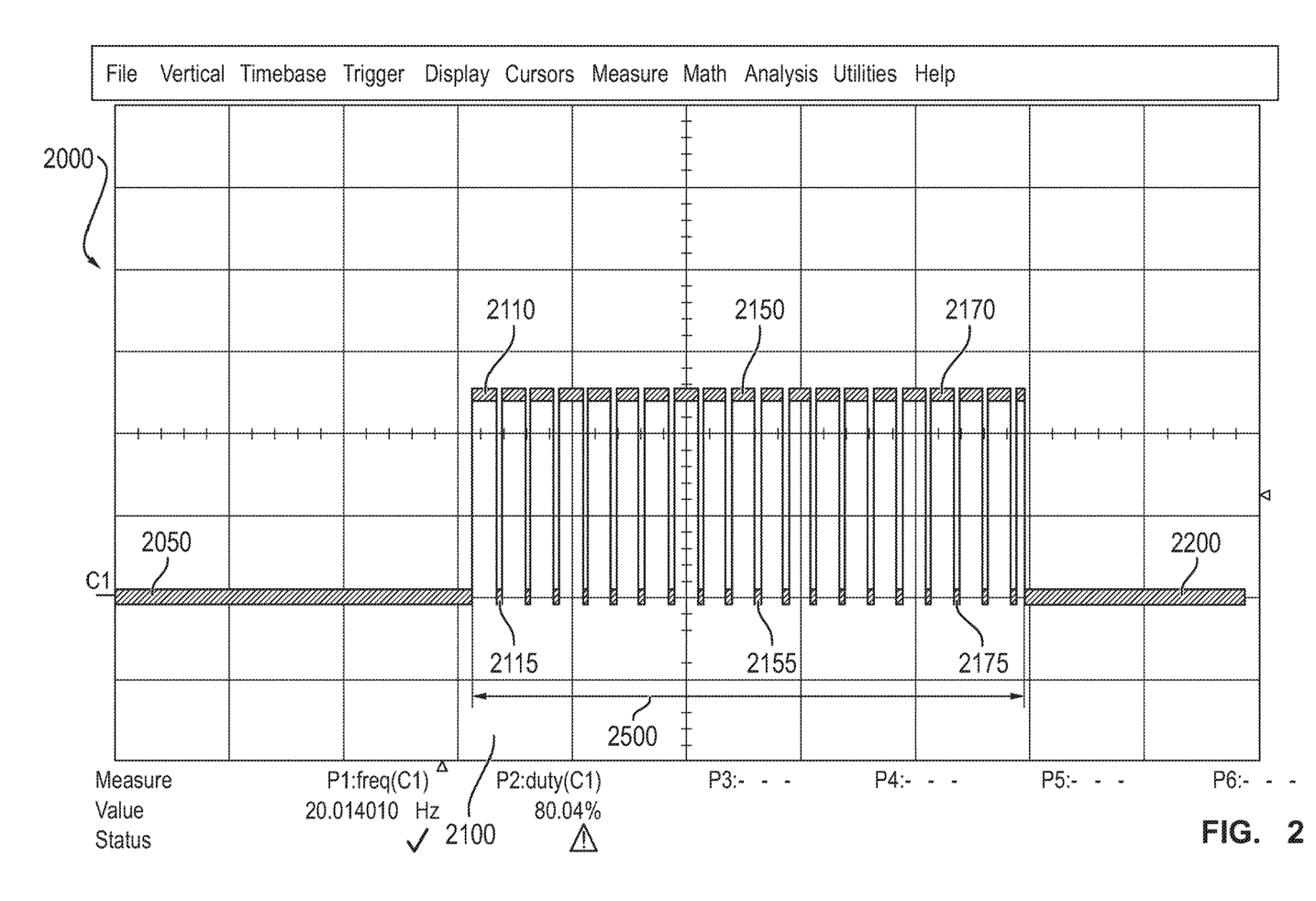
FIG. 2 gives an example of a duty cycle for degluing.

FIG. 2 shows an example of a degluing cycle according to a preferred embodiment of the present invention. A diagram 2000 shows an initial state 2050 where no power is applied and a final state 2200 where no power is supplied as well. Once a stage 2100 is reached, e.g. when it has been detected that a faulty contact open-close state is present in the apparatus, the controller may start a degluing cycle over a period of time 2500. In this case, beneficially, at a pulse-width modulated frequency of 20 Hz, and at a duty cycle of 80%, contacts of a relay are vibrated. Peaks 2110, 2150 and 2170 are shown that are followed by respectively valleys 2115, 2155 and 2175. Accordingly, corresponding to the duty cycle, the valleys are much smaller in width than the peaks. It has been shown in tests that such a duty cycle with such a pulse-width modulated frequency is suitable to deglue contacts of the relays in question efficiently. However, different frequencies and different duty cycles over a different period of time may also be sufficient to perform the task.

Beneficially, the period at which the degluing duty cycle is applied is 1 second. It may also be preferably 1.5 seconds or 2 seconds as desired. However, it has to be taken into consideration that the operation at such a duty cycle and with such a frequency puts the circuitry and the coil in the relay under thermal and mechanical stress, hence the degluing. Therefore, care should be taken that the relay is not overloaded. The period respectively the duty cycle applied to the relay can be repeated in case it is detected that after 1 second the relay contacts are still not open.

Figure 3:
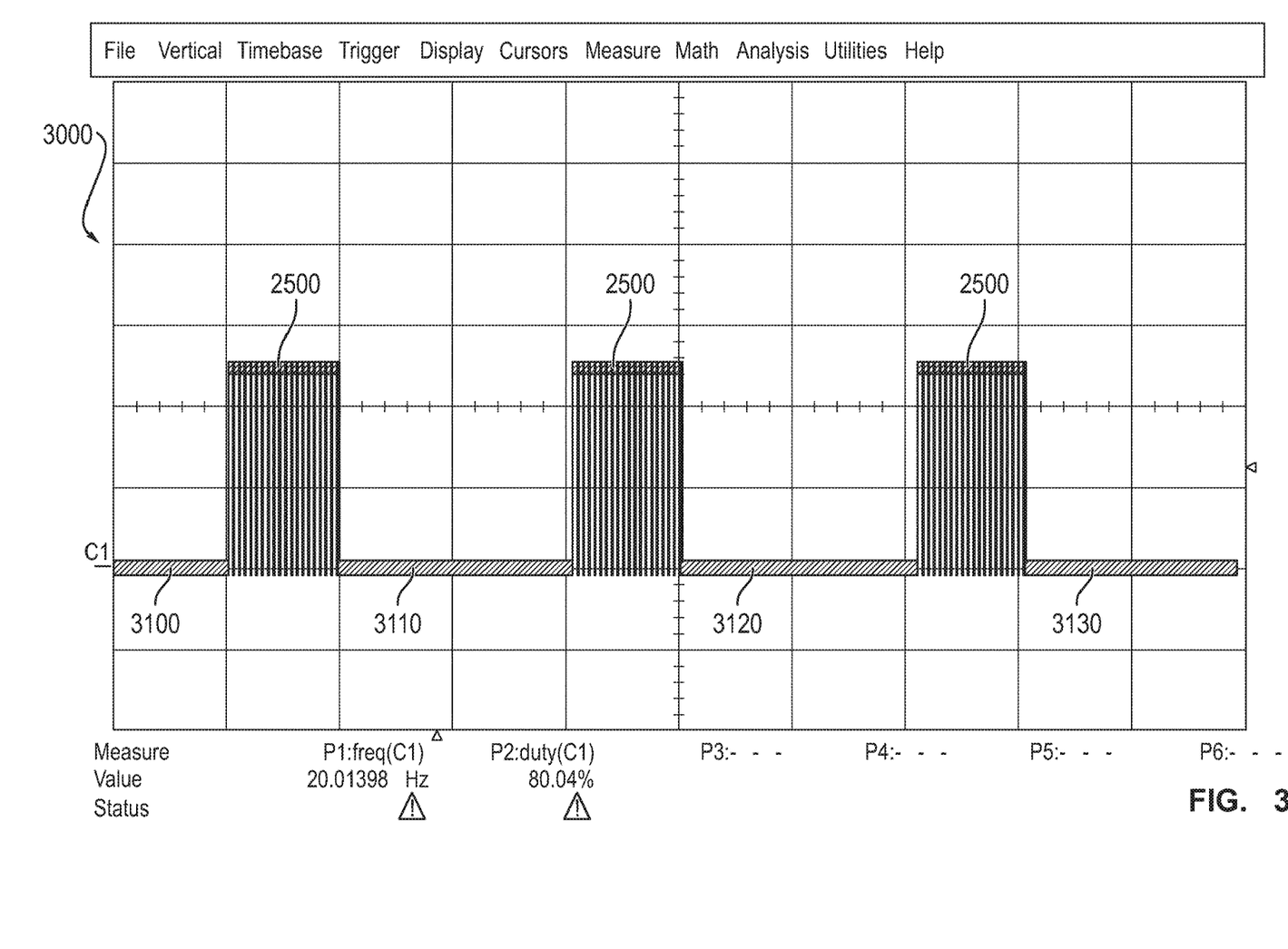
FIG. 3 gives an example of multiple degluing cycles and delays between them, and FIG. 4 gives an example of a method according to the present invention.

As FIG. 3 shows, multiple degluing cycles having periods 2500 can be performed one after another. The diagram 3000 shows an initial phase 3100 and delays between the degluing cycles 3110, 3120 and 3130.

Beneficially, a number of five degluing cycles may be performed in which preferably a duty cycle of 80% is maintained and a pulse-width modulation frequency of 20 Hz is applied by the controller.

Beneficially, five such degluing cycles may be performed in order to effectively deglue relay contacts. Test results have shown that if after five attempts have been conducted after which still no degluing of the contacts took place, preferably the relay should be replaced.

Figure 4:
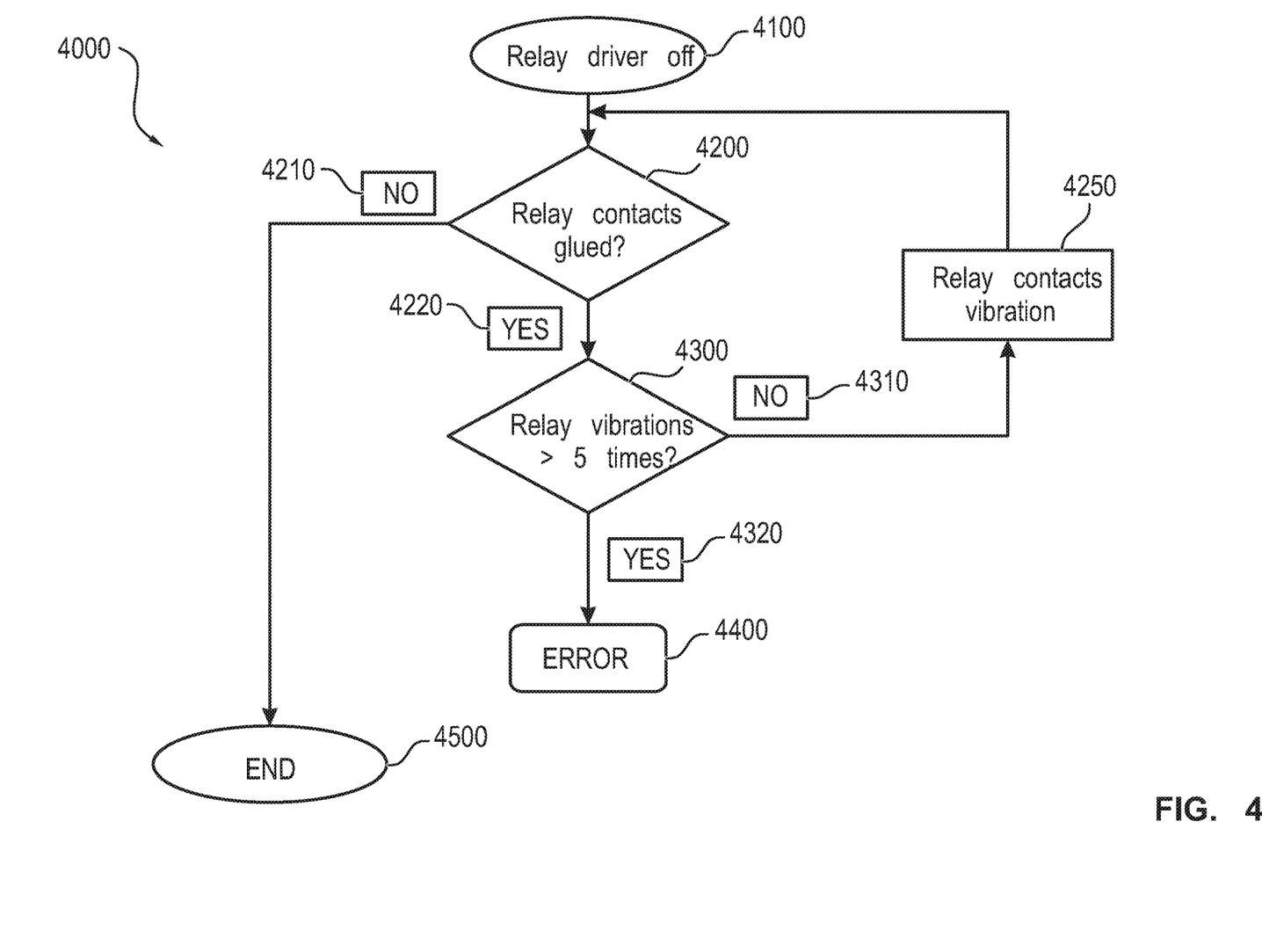

As FIG. 4 shows, a method for operating a relay according to an embodiment of the invention starts in a driver off-state of a relay 4100 and proceeds to an interrogation 4200 at which it is determined if the relay contacts are glued. If this is not the case at 4210, the method 4000 is stopped at 4500. On the other hand, if the relay contacts are glued, this is determined at 4220, relay vibrations are effected at 4300. Those vibrations are preferably caused by controlling the relay at a duty cycle of 80% and applying a pulse-width modulated frequency of 20 Hz to the control circuit of the relay to cause the contacts closing the load circuit and being glued to open. If the relay contacts are still not open 4250, this is again determined at 4200. At 4300, it is determined in an interrogation, if the cycle has been repeated five times. Any other predetermined number instead of five may be chosen according to the application and the relay. If this is the case 4320, an error signal may be generated 4400 which may lead to an indication to a user in form of a light written message or any other signal, e.g. a wireless communication to a mobile device.

LIST OF REFERENCE NUMERALS

1000 apparatus
1100 controller
1160 error signal
1110 indicator
1120, 1130 control line
1500 relay
1540, 1530 relay contacts
1520, 1510 relay contacts of the control circuit
1710 load circuit
1600 load
1500 relay
1540, 1530 relay contacts of the load circuit
1800 measurement device
1810 verification signal line
1150 memory of controller
1800 computer program product
1810 program code
1820 memory device
2000 diagram of degluing cycle
2050 initial phase
2200 final phase
2100 start of degluing duty cycle
2110, 2150, 2170 peaks of pulse-width modulated signal
2150, 2155, 2175 valleys of pulse-width modulated signal
2500 duration of period of degluing cycle
3000 diagram of plural degluing cycles
3100 initial phase
3110 first delay between duty cycles
3120 second delay between duty cycles
3130 final phase
4000 method
4100, 4200, 4300, 4250, 4400, 4500 method steps
4210, 4220, 4310, 4320 decision branches

The invention claimed is:

1. An apparatus for controlling a relay at least comprising:
a driver to energize a coil of the relay;

a measuring device to verify if contacts of the relay are glued together and output a verification signal indicating the contacts of the relay are glued together; and a controller adapted to control the driver with a duty cycle of 60 to 90% in dependency of the verification signal.

2. The apparatus according to claim 1, wherein the measurement device emanates a control signal as verification signal according to a switch state, and the controller is adapted to control the duty cycle for a predetermined amount of time.

3. The apparatus according to claim 2, wherein the driver operates the coil with a pulse-width modulated signal of a certain predetermined frequency.

4. The apparatus according to claim 3, wherein the frequency is between 15 and 25 Hz.

5. An apparatus for controlling a relay at least comprising:
a driver to energize a coil of the relay;
a measuring device to verify a conductive state of a load contact of the relay outputting a verification signal;
a controller adapted to control the driver with a duty cycle in dependency of the verification signal, wherein the controller is adapted to control the duty cycle in dependency of the verification signal over plural periods of time with at least a delay between them; and
a counter for counting a number of the periods and after the counter has reached five, the duty cycle is stopped and a notification signal is generated to provide an indication.

6. A Method for operating a relay at least comprising:
verifying if contacts of the relay are glued together; and
operating the relay with a duty cycle and a pulse-width modulated signal having a frequency between 15 Hz and 25 Hz to deglue the contacts.

7. The method according to claim 6, wherein the steps are repeated plural times with a delay between them.

8. The method according to claim 6, wherein the steps are maximally repeated five times and after that a notification signal is generated.

9. The method according to claim 6, wherein a delay between consecutive degluing cycles is 1 second and/or the duty cycle is 70 to 90%, wherein a degluing cycle comprises the operating the relay with a duty cycle to deglue the contacts.

10. A method for operating a relay at least comprising:
verifying if contacts of the relay are glued together; and
operating the relay with a duty cycle and a pulse-width modulated signal having a predetermined frequency to deglue the contacts, wherein a delay between consecutive degluing cycles of the operating the relay is 1 second and/or the duty cycle is 70 to 90%, and/or the frequency of the pulse width modulated signal is between 15 to 25 Hz, and a number of successful degluing cycles of the relay contacts is counted and after a predetermined number, a notification is generated.

11. A Household appliance comprising an apparatus according to claim 1.

12. A Computer program product comprising computer-readable instructions on a computer-readable memory that when read and loaded into a memory of a controller cause the controller to perform the method steps of claim 6 as process steps.

13. The apparatus according to claim 1, wherein the controller is adapted to apply a duty cycle of 70 to 85%.

14. The apparatus according to claim 1, wherein the controller is adapted to apply a duty cycle of 80%.

15. The apparatus according to claim 3, wherein the frequency is between 17 to 22 Hz.

16. The apparatus according to claim 3, wherein the frequency is 20 Hz.

17. The method according to claim 6, wherein the delay is 1.5 seconds and/or the duty cycle is 70 to 85% and/or the frequency of the pulse-width modulated signal is between 17 to 22 Hz.

18. The method according to claim 6, wherein the delay is 2 seconds and/or the duty cycle is 80% and/or the frequency of the pulse-width modulated signal is 20 Hz.

* * * * *

UNITED STATES PATENT AND TRADEMARK OFFICE
CERTIFICATE OF CORRECTION

PATENT NO. : 10,573,476 B2  
APPLICATION NO. : 15/326533  
DATED : February 25, 2020  
INVENTOR(S) : Jeanneteau et al.

Page 1 of 1

It is certified that error appears in the above-identified patent and that said Letters Patent is hereby corrected as shown below:

In the Specification

Column 1, Line 17: please delete the word "is"

Column 1, Line 22: please replace "controts" with -- controls --

Signed and Sealed this
Twelfth Day of May, 2020

Andrei Iancu
*Director of the United States Patent and Trademark Office*